United States Patent [19]

Sasaki et al.

[11] Patent Number: 5,566,899
[45] Date of Patent: Oct. 22, 1996

[54] RETRACTOR WITH A CLAMPING MECHANISM FOR USE IN A SEAT BELT DEVICE

[75] Inventors: Takanobu Sasaki; Kazumi Hirata, both of Kanagawa, Japan

[73] Assignee: NSK Ltd., Tokyo, Japan

[21] Appl. No.: 334,368

[22] Filed: Nov. 3, 1994

[30] Foreign Application Priority Data

Nov. 4, 1993 [JP] Japan .................................. 5-063683

[51] Int. Cl.⁶ .................................................. B65H 75/30
[52] U.S. Cl. ........................................ 242/381.1; 280/806
[58] Field of Search ............................ 242/381.1, 381.3, 242/381.4; 280/806, 807; 297/476, 478, 480

[56] References Cited

U.S. PATENT DOCUMENTS

| 4,687,253 | 8/1987 | Ernst et al. | 297/478 |
| 4,938,431 | 7/1990 | Smithson | 242/381.1 |

FOREIGN PATENT DOCUMENTS

| 3613430 | 10/1987 | Germany | 280/806 |
| 3931973 | 4/1991 | Germany | 280/806 |

Primary Examiner—Daniel P. Stodola
Assistant Examiner—Emmanuel M. Marcelo
Attorney, Agent, or Firm—Sughrue, Mion, Zinn, Macpeak & Seas

[57] ABSTRACT

In a retractor with a clamping mechanism for holding a webbing directly in a vehicle emergency, the retractor provides a retractor base, a lower plate fixed to the retractor base, and a movable clamp member for holding the webbing between itself and the lower plate, in which the clamp member includes on a webbing opposing surface thereof a plurality of substantially conical-shaped clamp teeth for biting into a surface of the webbing to hold the webbing, and the clamp member is so structured that a webbing pushing force of both end portions thereof are weaker than the pushing force of a central portion thereof. Accordingly, even if a strong tensile force is applied to the webbing held by the clamp member to bend the respective central portions of the lower plate and the retractor base in an outwardly projecting manner, the clamp teeth formed on both the end portions thereof in the webbing width direction are prevented from pushing against the lower plate because the webbing pushing forces thereof are weaker than that of the central portion thereof. Therefore, the clamp teeth can bite into the surface of the webbing sufficiently, so that the clamp member holds the surface of the webbing uniformly.

7 Claims, 8 Drawing Sheets

RETRACTOR WITH A CLAMPING MECHANISM FOR USE IN A SEAT BELT DEVICE

BACKGROUND OF THE INVENTION

The present invention relates to a retractor (a winding device) for use in a seat belt device, particularly, to an improved retractor with a clamping mechanism which holds the webbing directly in an emergency of a vehicle to minimize the amount of draw-out of the webbing.

Conventionally, there has been employed a seat belt device which restrains an occupant of a vehicle to thereby protect the occupant against shocks given in a vehicle collision. The seat belt device employs a retractor of a type which includes not only an emergency locking mechanism for locking the rotation of a winding shaft with the webbing wound therearound in the draw-out direction thereof in a vehicle emergency such as a collision or the like, but also a clamping mechanism for holding the webbing directly to prevent the seat belt from being drawn out, thereby improving the restricting performance of the occupant in the early stage of the collision.

For example, a conventional clamping mechanism shown in FIG. 15 includes a wedge-shaped clamp 6 for clamping and engaging a webbing 26 between itself and a lower plate 16 fixed to a base back plate 1b of a retractor base 1 formed by bending a steel plate into a substantially U-shaped shape. The conventional clamping mechanism further includes an upper plate 20 having a sliding contact surface 20a capable of sliding contact with a plane portion 6d located opposite to a webbing opposing surface 6c of the clamp 6 for guiding the clamp 6 to a clamping and engaging position, whereby in a vehicle emergency a clamp lever 7 is operated to move the clamp 6 to the webbing clamping and engaging position, and the clamp 6 is wedged into an area between a sliding contact surface 20a of the upper plate 20 and the lower plate 16 to thereby hold the webbing 26.

And, in the webbing opposing surface 6c of the clamp 6, there are formed a plurality of substantially conical-shaped clamp teeth 6e in such a manner that they extend almost over the whole of the webbing surface opposed to the webbing opposing surface 6c. When the clamp 6 holds the webbing 26, the clamp teeth 6e bite into the surface of the webbing 26 to thereby prevent the webbing 26 from being drawn out from the retractor.

However, while the webbing 26 is being held by the clamp 6 and lower plate 16, if a strong tensile force is applied to the webbing to pull it out from the retractor, then not only a frictional force acting on the holding portion of the webbing 6 in the opposite direction to the webbing draw-out direction but also a thrusting force acting on the lower plate 16 are both increased, so that the clamp 6 is pressed against the lower plate 16 more strongly.

Then, as shown in FIG. 16 which is a horizontal section view of the main portions of the conventional clamping mechanism, both of the lower plate 16 and the base back plate 1b of the retractor base 1 are bent outwardly in the respective central portions thereof. As a result of this, the clamp teeth 6e formed on the two end portions of the clamp 6 in the webbing width direction thereof are thrust against the lower plate 16, so that the clamp 6 is not able to wedge between the sliding contact surface 20a of the upper plate 20 and the lower plate 16 sufficiently and thus the clamp teeth 6e formed on the central portion in the webbing width direction are not able to bite into the webbing 26 sufficiently.

Therefore, the biting force of the clamp teeth 6e formed on the clamp 6 into the webbing 26 is lowered as a whole, which makes it impossible to enhance the clamp force to hold the webbing 26 sufficiently. As a countermeasure against this, that the thickness of the lower plate 16 can be increased to enhance the rigidity thereof in order to prevent the lower plate 16 from bending. However, this increases not only the size of the lower plate 16 but also the weight thereof, which in turn increases the size of the retractor as a whole.

SUMMARY OF THE INVENTION

The present invention aims at eliminating the drawbacks found in the conventional retractor. Accordingly, it is an object of the present invention to provide a highly reliable retractor with a clamping mechanism in which a clamp member is able to hold the surface of a webbing uniformly even in a high load operation to always provide a stable and strong clamp force.

In attaining the above object, according to a first aspect of the present invention, there is provided a retractor with a clamping mechanism for holding a webbing directly in a vehicle emergency, the retractor providing: a retractor base; a lower plate fixed to the retractor base; a movable clamp member for holding the webbing between itself and the lower plate, in which the clamp member includes on the webbing opposing surface thereof a plurality of substantially conical-shaped clamp teeth for biting into the surface of the webbing to hold the webbing, and the clamp member is so structured that the webbing pushing forces of both end portions thereof are weaker than the pushing force of the central portion thereof.

According to a second aspect of the present invention, there is provided a retractor with a clamping mechanism for holding a webbing directly in a vehicle emergency, the retractor providing: a retractor base; a winding shaft supported rotatably on the retractor base for winding a webbing therearound; a lower plate fixed to the retractor base; and a movable clamp member for holding the webbing between itself and the lower plate, the clamp member including on a webbing opposing surface thereof a plurality of clamp teeth respectively formed in a substantially conical shape for biting into a surface of the webbing to hold the webbing, and the clamp teeth being so arranged as to decrease in number toward the winding shaft from a webbing exit side.

According to a third aspect of the present invention, there is provided a retractor with a clamping mechanism for holding a webbing directly in a vehicle emergency, the retractor providing: a retractor base; a winding shaft supported rotatably on the retractor base for winding a webbing therearound; a lower plate fixed to the retractor base; a movable wedge-shaped clamp member for holding a webbing between itself and the lower plate; and an upper plate for guiding the clamp member to a webbing holding position, in which the clamp member includes on a webbing opposing surface thereof a plurality of clamp teeth for holding the webbing, and the clamp teeth being respectively formed in a substantially conical shape and being so arranged as to decrease in number toward the winding shaft from the webbing exit side.

According to the above-mentioned structure of the present invention, even if a strong tensile force is applied to the webbing held by the clamp member to bend the respective central portions of the lower plate and the base back plate of the retractor in an outwardly projecting manner, the clamp teeth of the clamp member formed on both the end portions thereof in the webbing width direction are prevented from pushing against the lower plate since the webbing pushing forces thereof are weaker than the webbing pushing force of the central portion thereof. Due to this, the clamp teeth formed on the central portion of the clamp member in the webbing width direction are able to bite into the surface of the webbing sufficiently, so that the clamp member can hold the surface of the webbing uniformly.

DETAILED DESCRIPTION OF THE PREFERRED EMBODIMENTS

Description will be given below in detail of embodiments of a retractor with a clamping mechanism according to the present invention with reference to the accompanying drawings.

Figure 1:
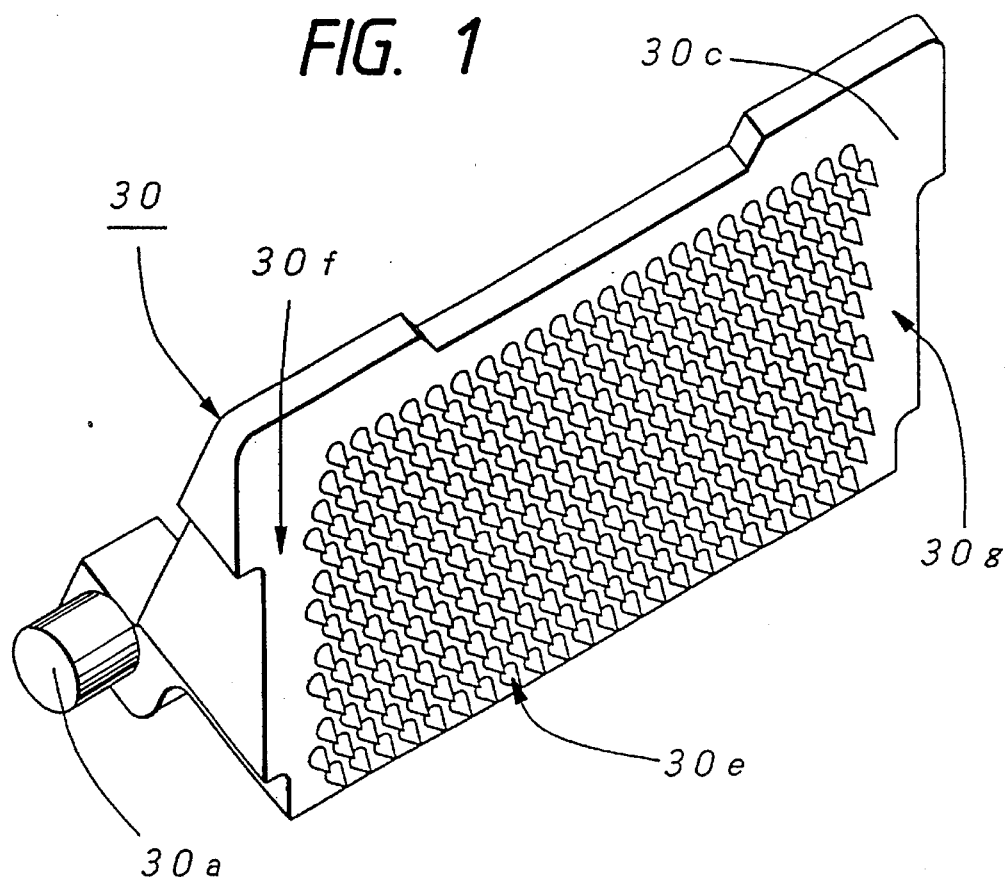
FIG. 1 is a perspective view of the whole of a clamp member structured according to a first embodiment of the present invention.
Figure 2:
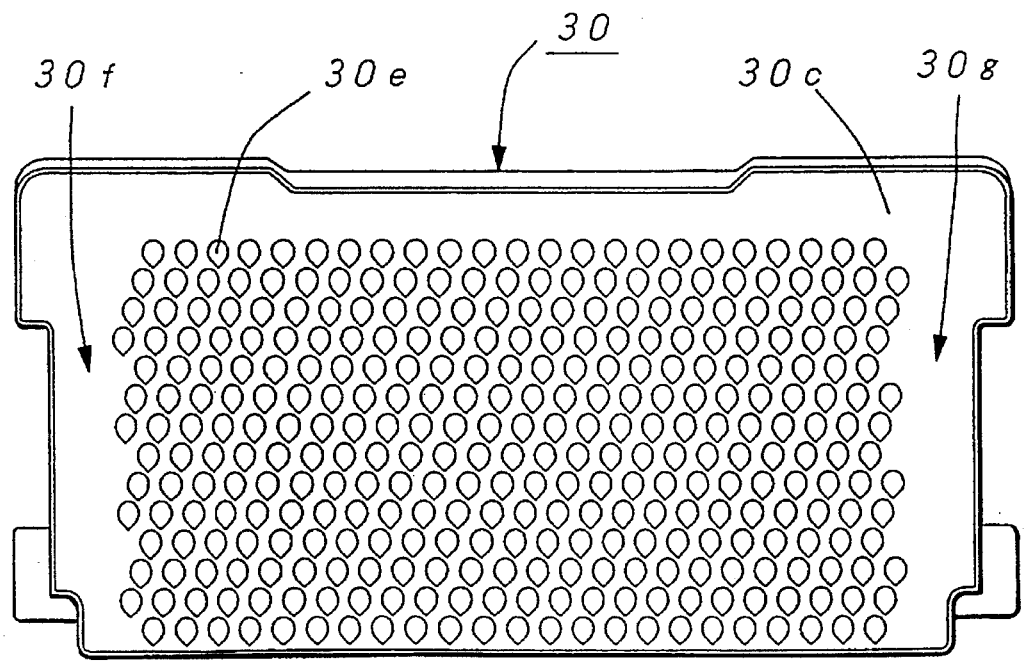
FIG. 2 is a front view of clamp teeth formed on the clamp member shown in FIG. 1, showing the arrangement thereof.
Figure 13:
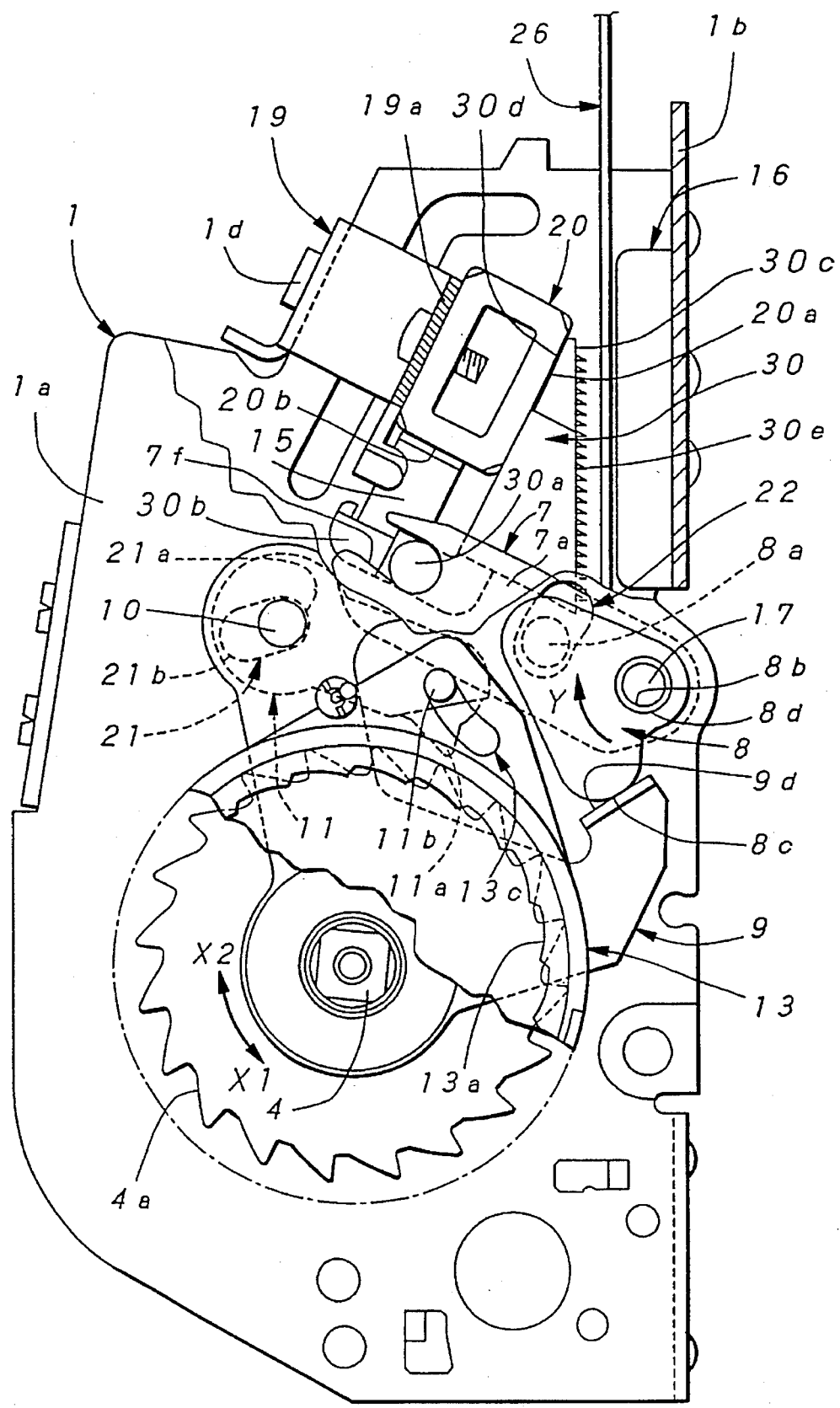
FIG. 13 is a partially broken section view of a retractor with a clamping mechanism, explaining the operation thereof.
Figure 14:
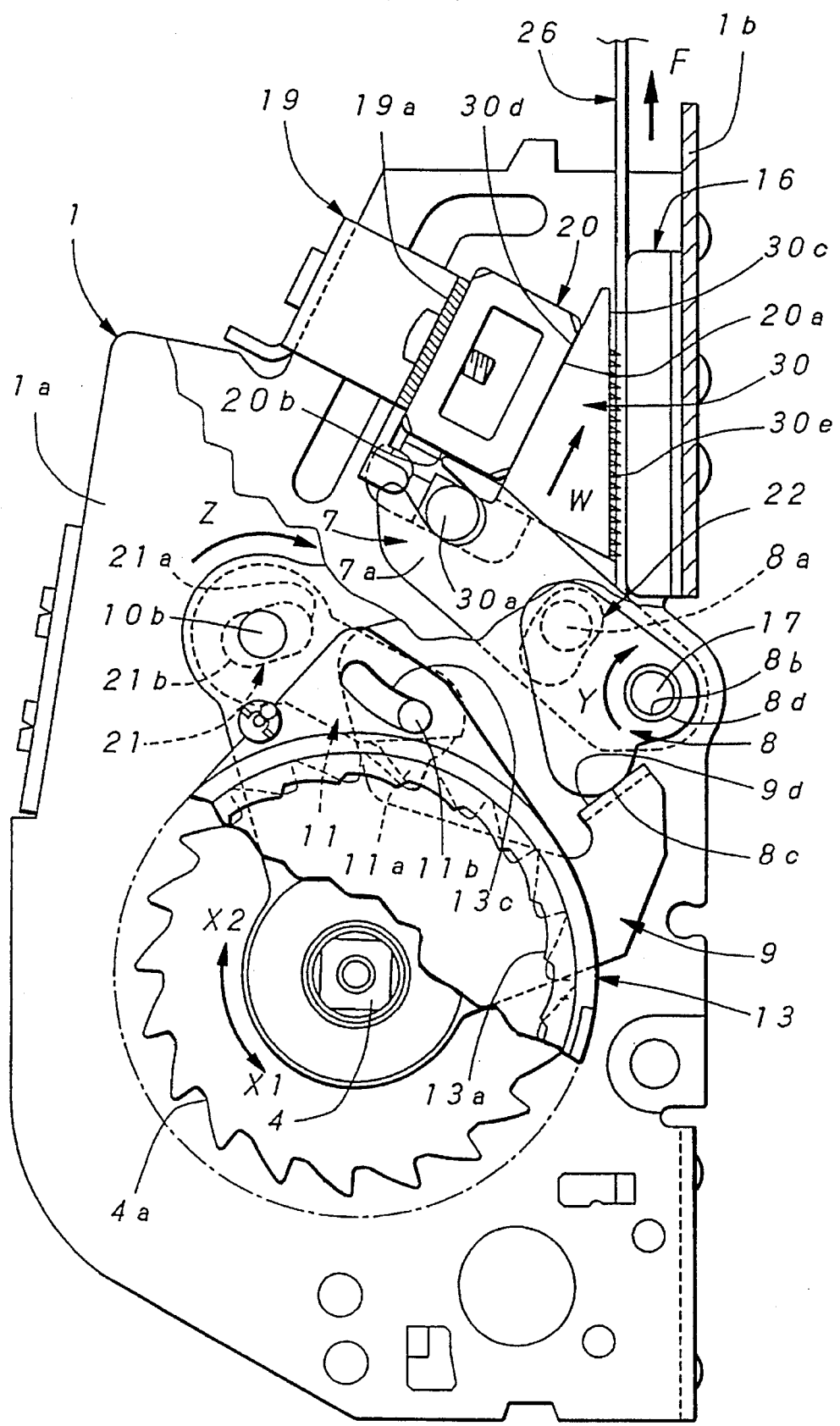
FIG. 14 is also a partially broken section view of a retractor with a clamping mechanism, explaining the operation thereof.
Figure 15:
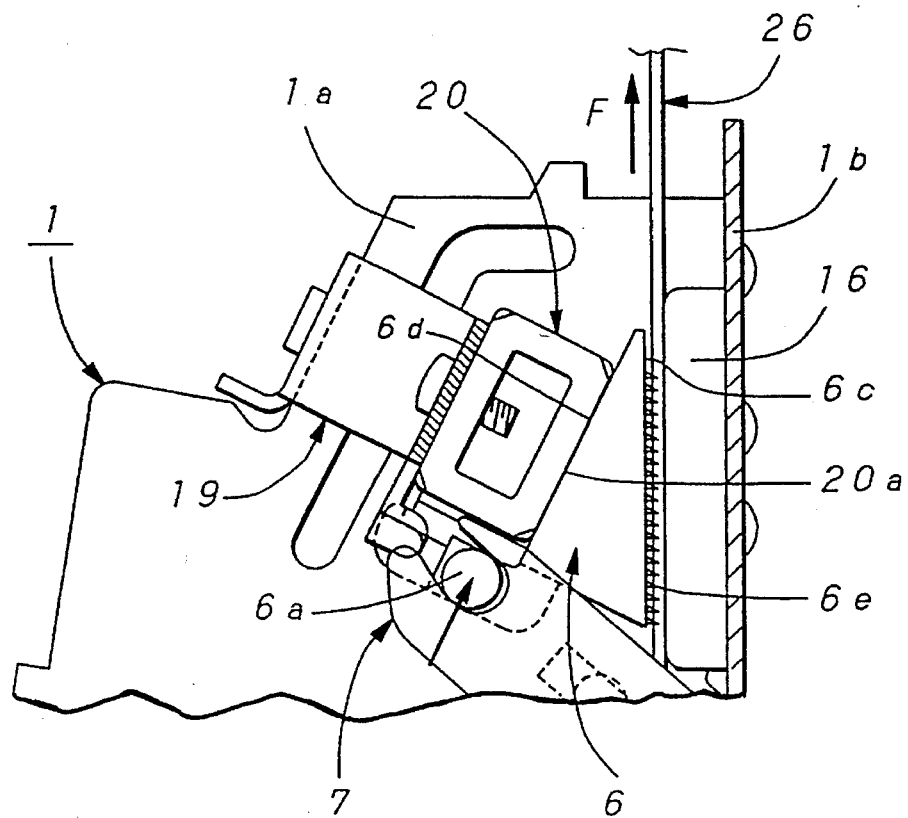
FIG. 15 is an enlarged side view of the main portions of a conventional clamping mechanism.
Figure 16:
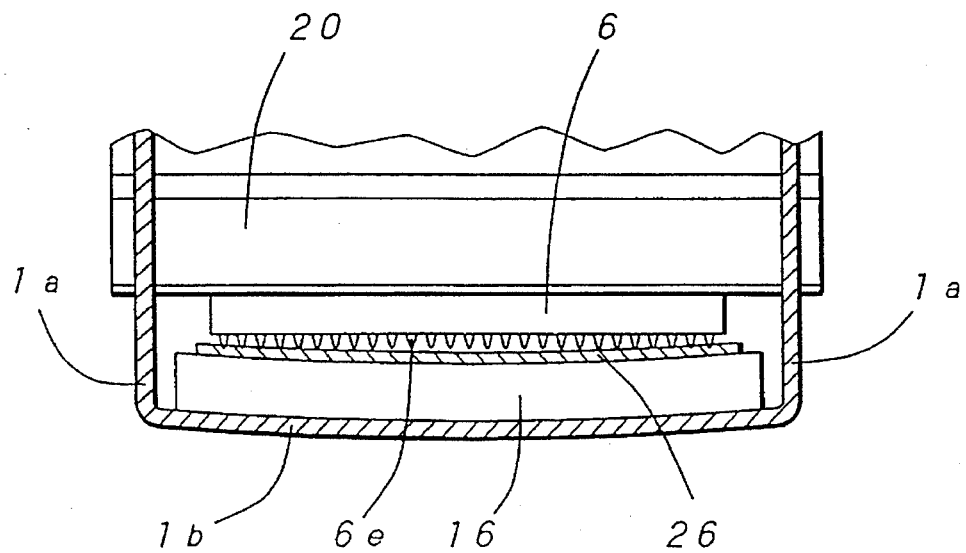
FIG. 16 is a horizontal section view of the main portions of the conventional clamping mechanism, showing a state in which a high load is applied to a webbing.

In particular, FIG. 1 is a perspective view of the whole of a clamp member according to a first embodiment of the present invention, FIG. 2 is a front view of an arrangement of clamp teeth formed on the clamp member shown in FIG. 1, and FIGS. 13 and 14 are respectively a partially broken side view of a retractor with a clamping mechanism according to the first embodiment, explaining the operation thereof.

At first, description will be given of the clamping mechanism of the retractor according to the present invention by use of FIGS. 13 and 14.

In the retractor with the clamping mechanism according to the first embodiment, a retractor base 1 is formed by bending a steel plate into a substantially U-liked shape and includes a pair of mutually opposing side plates 1a and two through holes respectively so formed in the side plates 1a as to face each other. A winding shaft 4 with a bobbin fixed thereto is rotatably journaled in the through holes. A webbing 26 is to be wound around the bobbin.

A well known tension reducer mechanism (not shown) is disposed at one end of the winding shaft 4. The winding shaft 4 is always energized in a direction to wind the webbing 26 onto the bold. Further, at the other end of the winding shaft 4 there is disposed an emergency locking mechanism which is used to prevent the webbing from being drawn out in an emergency.

The emergency locking mechanism includes a ratchet plate 4a consisting of a ratchet wheel fixed to the other end portion of the winding shaft 4. A tension plate 9 and a ratchet cup having inner teeth 13a are loosely fitted over the outwardly projecting portion of the winding shaft 4. An energizing force is applied to the ratchet cup 13 so as to rotate it in a direction of an arrow X2 by a return spring (not shown) with one end thereof secured to a spring hanger of the tension plate 9. And, in the portion of the winding shaft 4 situated outside of the ratch cup 13, there are disposed a known lock device and an inertia member (both of which are not shown). That is, if tension is applied onto the webbing in an emergency such as a collision or the like and thus a shocking rotational force of a predetermined value or more is applied to the winding shaft 4 in a webbing draw-out direction (namely, in a direction of an arrow X1), then the lock device and inertia member rotate the ratchet cup 13 in the arrow X1 direction against the energizing force of the return spring.

Also, a pawl 11, which is engageable with the ratchet plate 4a to thereby prevent the ratchet plate 4a from rotating in the webbing draw-out direction (in the arrow X1 direction), is rotatably journaled by a pawl pin 10 which is swingable along an elongated hole 21 formed in the side plate 1a, while the end portion of the pawl 11 is engaged with or disengaged from the ratch plate 4a. In the inward and upper portion of the retractor base 1 to be covered with a dust cover (not shown), there is provided a clamping mechanism which holds the webbing 26 directly to thereby prevent the webbing 26 from being drawn out.

The clamping mechanism includes a lower plate 16 fixed to a base back plate 1b of the retractor base 1, a clamp 30 which is a wedge-shaped clamp member for holding the webbing 26 between itself and the lower plate 16, an upper plate 20 in sliding contact with a plane surface portion 30d of the clamp 30 located opposite to a webbing opposing surface 30c of the clamp 30 to guide the clamp 30 to a webbing holding position, and an upper stay 19 for holding the upper plate 20.

As shown in FIGS. 1 and 2, on the webbing opposing surface 30c of the clamp 30, there are provided a large number of clamp teeth 30e each of which is formed in a substantially conical shape and has a sharpened end portion which easily bites into the surface of the webbing 26.

As can be clearly seen from a front view shown in FIG. 2, the clamp 30 according to the first embodiment does not include clamp teeth 30e in the two end portions 30f and 30g of the webbing opposing surface 30c in the webbing width direction.

That is, according to the structure of the first embodiment, after the clamp 30 is energized toward the lower plate 16 to hold the webbing 26, if a strong tensile force is applied onto the webbing 26 and thus the clamp 30 is pressed against the lower plate 16 with a stronger force so that the lower plate 16 together with the central portion of the base back plate 1b is bent and projected outwardly by the strong tensile force of the webbing 26, the two end portions of the clamp 30 in the webbing width direction do not push against the lower plate 16 but the clamp 30 is able to wedge between the sliding contact surface 20a of the upper plate 20 and the lower plate 16 sufficiently. Therefore, there is no possibility that the two end portions of the clamp 30 in the webbing width direction can push against the lower plate 16 to thereby lower the biting force of the clamp teeth 30e situated in the central portion of the clamp 30 in the webbing width direction into the webbing 26.

The upper stay 19 is fitted with a projection 1d of the side plate 1a and, by fixing the upper plate 20 to a mounting plate 19a thereof by a screw, the upper stay 19 restricts the movement of the upper plate 20 in the longitudinal direction thereof.

The upper plate 20 is so formed as to have a substantially rectangular section. After the two ends of the upper plate 20 are fitted into the through hole formed in the side plate 1a, the upper plate 20 is fixed to the mounting plate 19a of the upper stay 19 in such a manner that the sliding contact surface 20a of the upper plate 20 for guiding the clamp 30 to the webbing clamping and engaging position and the lower plate 16 can approach each other in the upper side in the figures and can have a predetermined angle of inclination between them.

Due to this, not only the webbing opposing surface 30c of the clamp 30 to be guided by the upper plate 20 can be always kept in parallel to the surface of the webbing 26, but also the clamp 30 is energized in a direction to part away from the webbing 26 by a return spring 15 interposed between an engaging portion 30b projectingly provided in the rear end side of the clamp 30 and a rear end face 20b of the upper plate 20.

Below the clamp 30, there is disposed a clamp lever 7 which is used to restrict the movement of the clamp 30 energized by the return spring 15. The clamp lever 7 cooperates with an outer plate 8, which is disposed within the side plate 1a and is engageable with the tension plate 9, in forming a lever member which is a linking device used to move the clamp 30 in the webbing clamping direction in linking with the emergency locking mechanism.

The clamp lever 7 provides a pair of plate-like members 7a each having a notch 7f engageable with a pivot shaft 30a projectingly provided on the side wall of the clamp 30, and a connecting portion connected between these two plate-like members 7a for abutment against the rear end wall of the clamp 30, while the clamp lever 7 is rotatably journaled by a lever pin 17. The outer plate 8 includes a hole 8b through which one end portion of the lever pin 17 extends, and the outer plate 8 is rotatably journaled along the side plate 1a. Further, the outer plate 8 includes an inner shaft portion 8a projecting inwardly to thereby extend through an elongated hole 22 in the side plate 1a and engage into an engaging hole formed in the plate-like member 7a, and a contact portion 8c engageable with an engaging portion 9d formed in a second swinging end portion of the tension plate 9.

And the clamp lever 7 is restricted the downward rotation by the inner shaft portion 8a secured in the elongated hole 22, whereby it restricts the movement of the clamp 30 against the energizing force of the return spring 15. That is, the pivot shaft 30a of the clamp 30 is supported by the notches 7f respectively formed on the swinging end sides of the pair of plate-like members 7a and the rear end wall of the clamp 30 is supported by the connecting portion of the clamp lever 7, whereby the webbing opposing surface 30c of the clamp 30 can be held at a position where it is not engageable with the webbing 26. Therefore, if the outer plate 8 is rotated upwardly, then the clamp lever 7 is rotated upwardly through the inner shaft portion 8a. The upwardly rotated clamp lever 7 presses against the pivot shaft 30a of the clamp 30 against the energizing force of the return spring 15 to thereby move the clamp 30 in a direction engageable with the webbing 26 while sliding the plane surface portion 30d of the clamp 30 along the sliding contact surface 20a of the upper plate 20. In this operation, the elongated hole 22 does not interfere with the inner shafts portion 8a at all.

Further, to the spring hanger (not shown) of the tension plate 9, there is secured the other end of a return spring (not shown) with one end thereof secured to a boss portion 8d of the outer plate 8, and the tension plate 9 is rotationally energized in the arrow X2 direction. Thus, the pawl pin 10 is energized in the webbing winding direction on the side of the end face 21a of the elongated hole 21 located on the back plate side.

Therefore, the lever member, which provides the clamp lever 7 and outer plate 8, and the tension plate 9 cooperate together to form a control device which can move the clamp 30 in the webbing holding direction to locate at a first position to prevent the draw-out of the webbing 26 or at a second position to allow the draw-out of the webbing 26.

Next, description will be given below of the operation of the above-mentioned retractor with the clamping mechanism.

At first, in normal use, as shown in FIG. 13, the clamp 30 is energized in a direction so that it is not engaged with the webbing by the energizing force of the return spring 15. Due to this, the inner shaft portion 8a of the outer plate 8 engageable with the clamp lever 7 is situated in the lower end of the elongated hole 22 by the energizing force of the return spring 15.

Also, the ratchet cup 13 is energized in the arrow X2 direction, and the pawl 11 including a pawl guide projection 11b engageable with the pawl guide hole 13c is energized in a direction unengageable with the ratch plate 4a, so that the webbing 26 can be drawn out freely.

Thus, as shown in FIG. 14, if a tensile force F is applied onto the webbing 26 in an emergency such as a collision or the like and a shocking rotational force of a predetermined value or more is applied onto the winding shaft 4 in the webbing draw-out direction (in the arrow X1 direction), then the lock device (not shown) is operated to rotate the ratchet cup 13 in the arrow X1 direction. Responsive to this, the pawl guide hole 13c in engagement with the pawl guide projection 11b rotates the pawl 11 through the pawl guide projection 11b in the arrow Z direction to thereby bring an engaging portion 11a of the pawl 11 into engagement with the ratchet plate 4a.

With the pawl 11 engaged with the ratchet plate 4a, if the winding shaft 4 is further rotated in the arrow X1 direction, then the pawl pin 10 journaling the pawl 11 is moved to the front side wall surface 21 side of the elongated hole 21, so that the tension plate 9 is rotated in the arrow X1 direction. Responsive to this, the swinging end portion 9d of the tension plate 9 rotates the outer plate 8 in the arrow Y direction through the contact portion 8c of the outer plate 8, so that the clamp Lever 7 is also rotated in the arrow Y direction through the inner shaft portion 8a.

And the clamp 30 in engagement with the end portion of the clamp lever 7 is immediately moved upwardly along the sliding contact surface 20a of the upper plate 20. Since the sliding contact surface 20a is inclined such that the upper portion thereof approaches the lower plate 16, the wedge-shaped clamp 30, which is slid upwardly against the energizing force of the return spring 15, is moved in the webbing holding direction (in the arrow W direction) and the clamp teeth 30e of the clamp 30 bite into the surface of the webbing 26 to thereby hold the webbing 26, so that the webbing 26 is held by and between the clamp 30 and lower plate 16 and is thereby prevented from being drawn out.

Then, even if a strong tensile force is further applied to the webbing 26, the clamp 30 is thereby pressed more strongly against the lower plate 16 and thus the lower plate 16, together with the central portion of the base back plate 1b, is projectingly bent outwardly by the strong tensile force of the webbing 26, the two end portions of the clamp 30 in the webbing width direction do not push against the lower plate 16 on the base back plate 1b, because the clamp teeth 30e are not provided on the two end portions of the clamp 30 in the webbing width direction.

Accordingly, there is no possibility that the biting forces of the clamp teeth 30e situated in the central portion of the clamp 30 in the webbing width direction into the webbing 26 can be weakened. On the contrary, even if high loads are applied, the clamp teeth 30e are able to bite into the webbing 26 and thus the clamp 30 can hold the webbing surface uniformly, thereby reliably preventing the draw-out of the webbing 26.

And, if the tensile force applied to the webbing 26 is removed, then the force to hold the clamp 30 in the holding direction does not exist any longer and thus the clamp 30 is energized by the energizing force of the return spring in the direction where it is not engageable with the webbing 26, thereby removing the clamping mechanism. At the same time, the tension plate 9 is also rotated in the removing direction (in the arrow X2 direction), and the clamp 30 and tension plate 9 return to their respective initial positions. If the webbing 26 is further wound, then the pawl 11 is rotated in the opposite direction to the arrow Z direction, thereby removing the locking between the ratchet plate 4a and engaging portion 11a of the pawl 11. If the webbing 26 is still further wound, then the lock device (not shown) is removed and the ratchet cup 13 is rotated in the arrow X2 direction and is thus returned to its initial position, so that the webbing 26 can be drawn out freely.

Here, the structure for weakening the webbing pressing force of the clamp member with respect to the two end portions of the webbing surface in the width direction is not limited to the arrangement of the clamp teeth 30e of the clamp 30. But, according to the present invention, other various arrangements can be employed.

Next, description will be given below of a clamp 40 constructed according to a second embodiment of the present invention. The second embodiment is similar in structure to the first embodiment, except for the clamp 40 and thus the detailed description thereof is omitted here.

Figure 3:
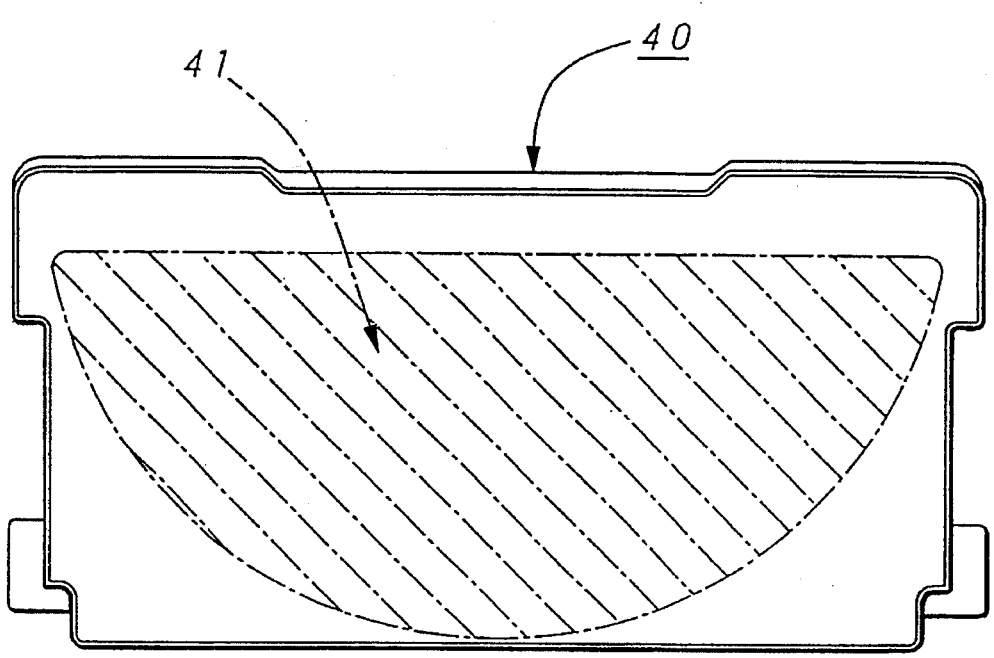
FIG. 3 is an explanatory view of a distribution of pressures with which the clamp member holds the webbing.
Figure 4:
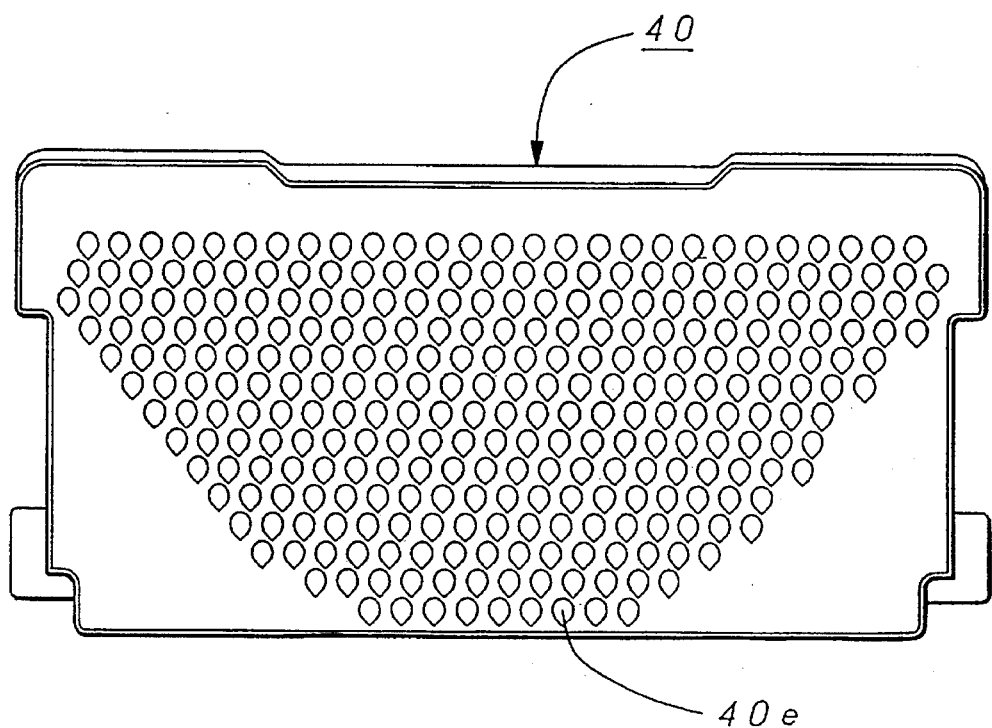
FIG. 4 is a front view of clamp teeth formed on a clamp member structured according to a second embodiment of the present invention, showing an arrangement thereof.

FIG. 3 is an explanatory view of a distribution of pressure when the clamp member holds the webbing. It is known that, in a pressure distribution at a hold portion between the webbing opposing surface of the clamp 40 and the lower plate 16, the pressure becomes high in a range 41 shown by one-dot chained lines in FIG. 3. Therefore, if the clamp teeth are arranged in such a manner that they are centralized in the high pressure range 41, then the biting of the clamp teeth situated in the central portion of the clamp 40 in the webbing width direction into the webbing can be improved.

As in the second embodiment shown in FIGS. 4 to 8, the clamp teeth 40e of the clamp 40 are arranged properly so that they substantially correspond to the high pressure range 41 in the pressure for holding the webbing between the webbing opposing surface of the clamp 40 and the lower plate 16. In such arrangement, the clamp teeth 40e are able to bite into the webbing 26 in the high pressure range where the webbing 26 is held by and between the clamp 40 and lower plate 16, which can enhance a force with which the clamp 40 and lower plate 16 hold the webbing 26 between them.

Figure 5:
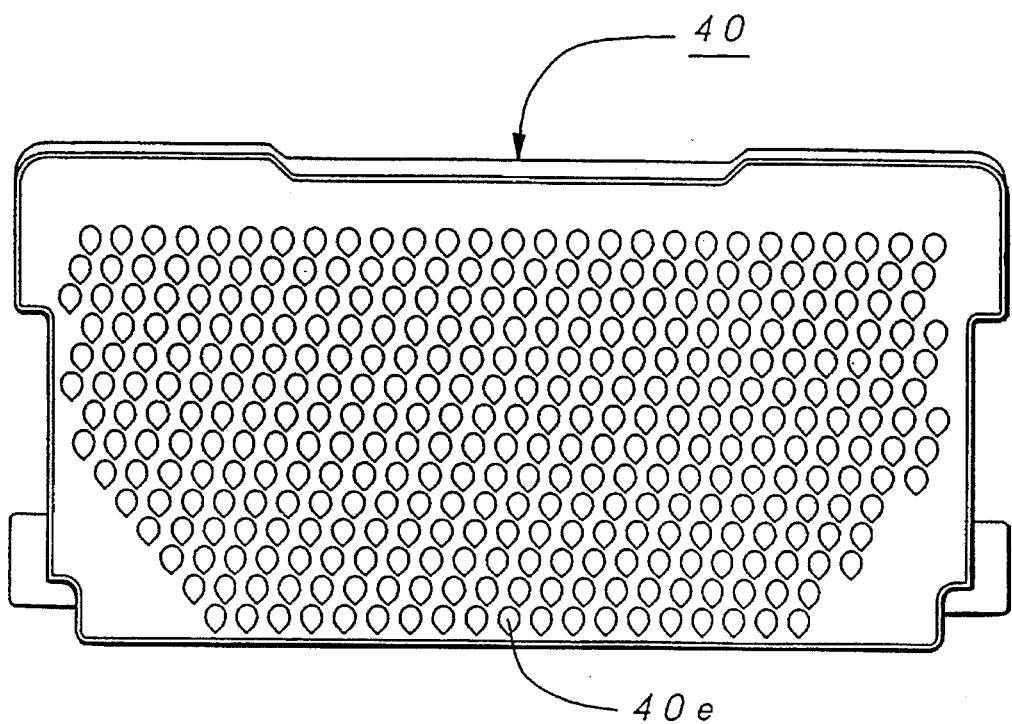
FIG. 5 is a front view of clamp teeth formed on the clamp member structured according to the second embodiment of the present invention, showing another arrangement thereof.
Figure 6:
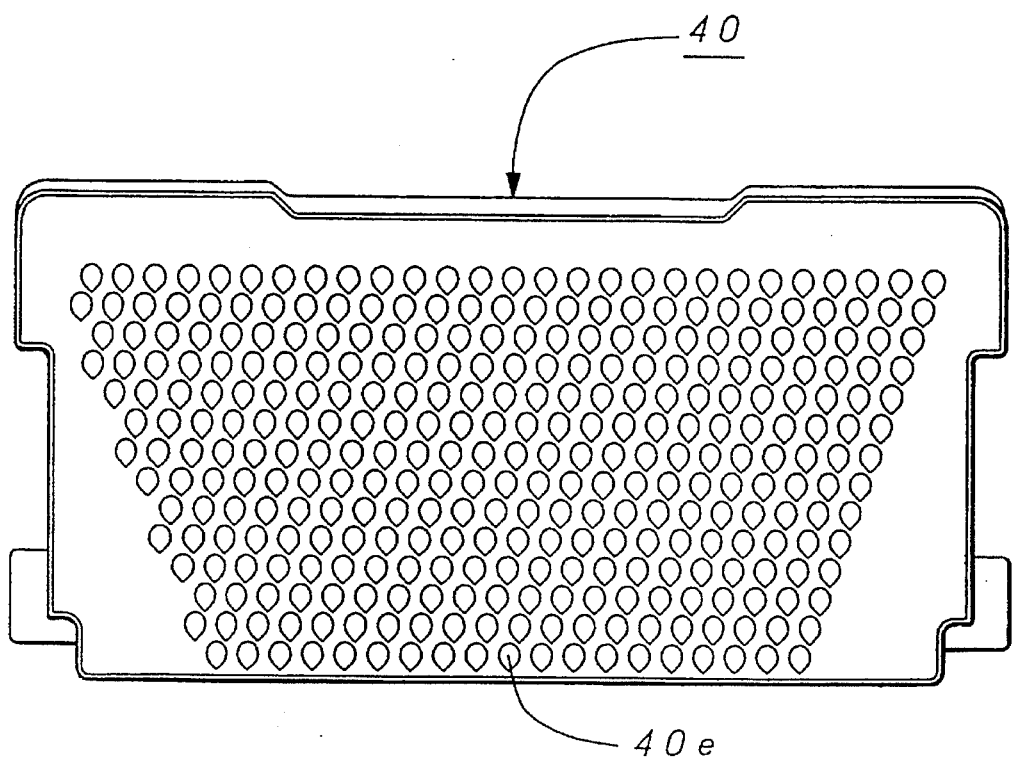
FIG. 6 is a front view of clamp teeth formed on the clamp member structured according to the second embodiment of the present invention, showing still another arrangement thereof.
Figure 7:
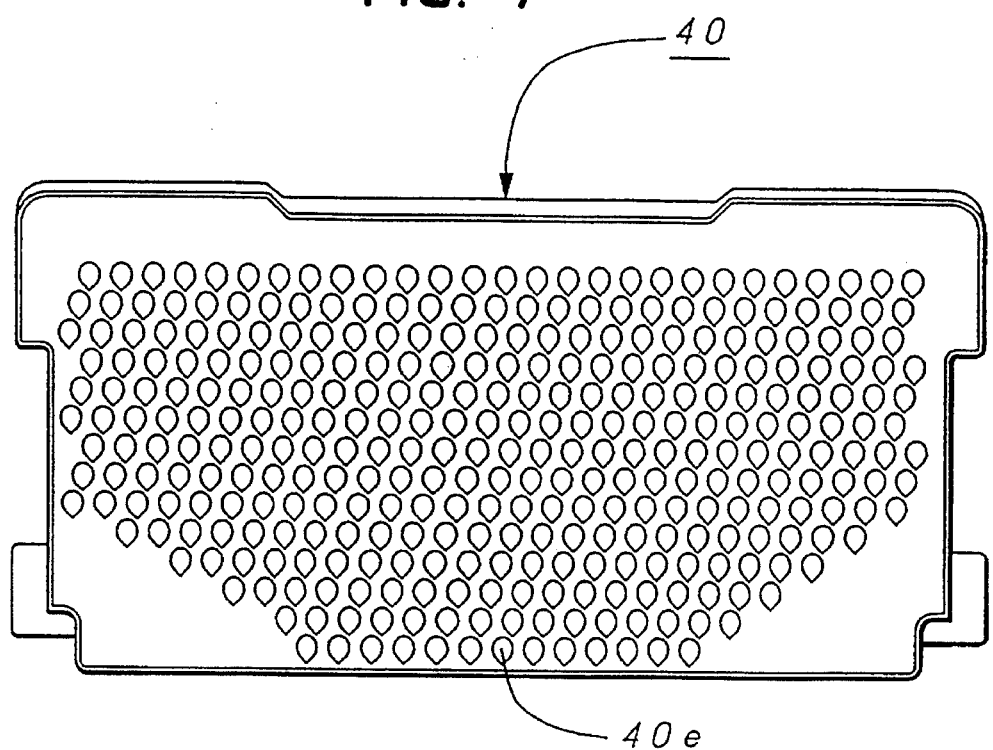
FIG. 7 is a front view of clamp teeth formed on the clamp member structured according to the second embodiment of the present invention, showing a further arrangement thereof.
Figure 8:
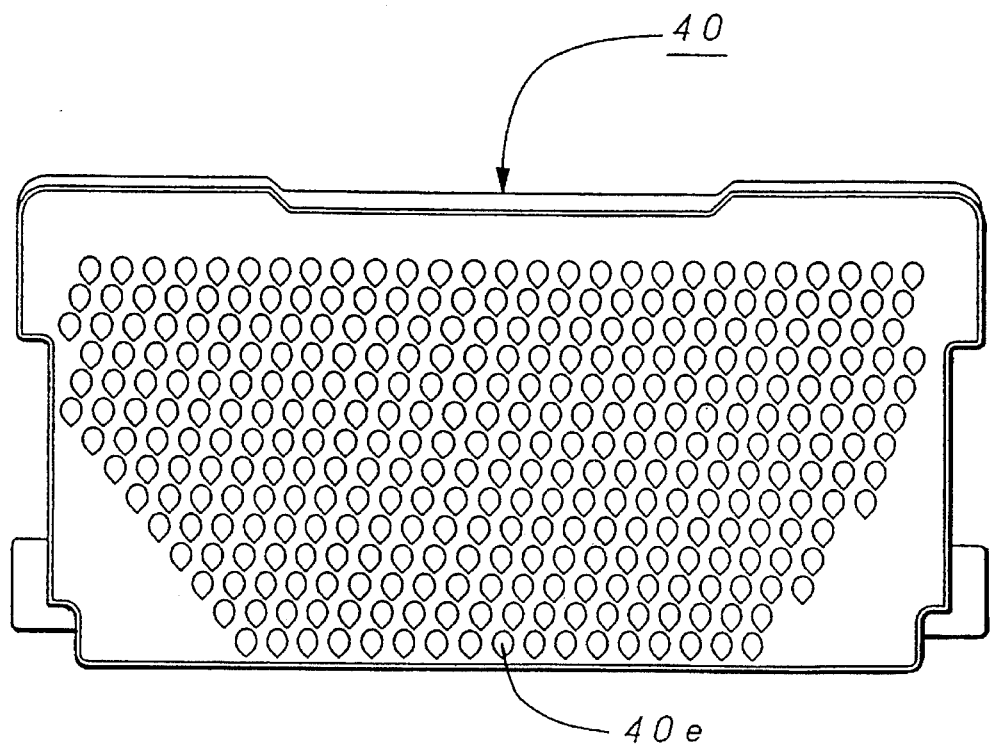
FIG. 8 is a front view of clamp teeth formed on the clamp member structured according to the second embodiment of the present invention, showing a still further arrangement thereof.

FIGS. 4 to 8 that show the arrangements of the second embodiment, the clamp teeth 40e of the clamp 40 are arranged in such a manner that the number of teeth is increased in the webbing draw-out direction. In particular, in FIG. 4, in three clamp teeth lines on the webbing exit side, the clamp teeth are provided almost up to the two ends of the clamp 40 and are so arranged as to decrease in number toward the side of the winding shaft 4. In FIG. 5, in half of the clamp teeth 40e lines on the webbing exit side, the clamp teeth 40e are provided almost up to the two ends of the clamp 40 and, in the other half of the lines, the clamp teeth are so arranged as to decrease in number toward the side of the winding shaft 4. In FIG. 6, the clamp teeth are so arranged as to decrease in number toward the side of the winding shaft 4 from the webbing exit side. In FIG. 7, in more than half of the all clamp teeth lines, the clamp teeth are provided up to the two ends of the clamp 40 on the webbing exit side. Also, in FIG. 8, in less than half of the all clamp teeth lines, the clamp teeth are provided up to the two ends of the clamp 40 on the webbing exit side and, in the remaining lines of the clamp teeth, the clamp teeth are so arranged as to decrease in number toward the side of the winding shaft 4.

Next, description will be given below of a clamp 50 according to a third embodiment of the present invention.

Figure 9:
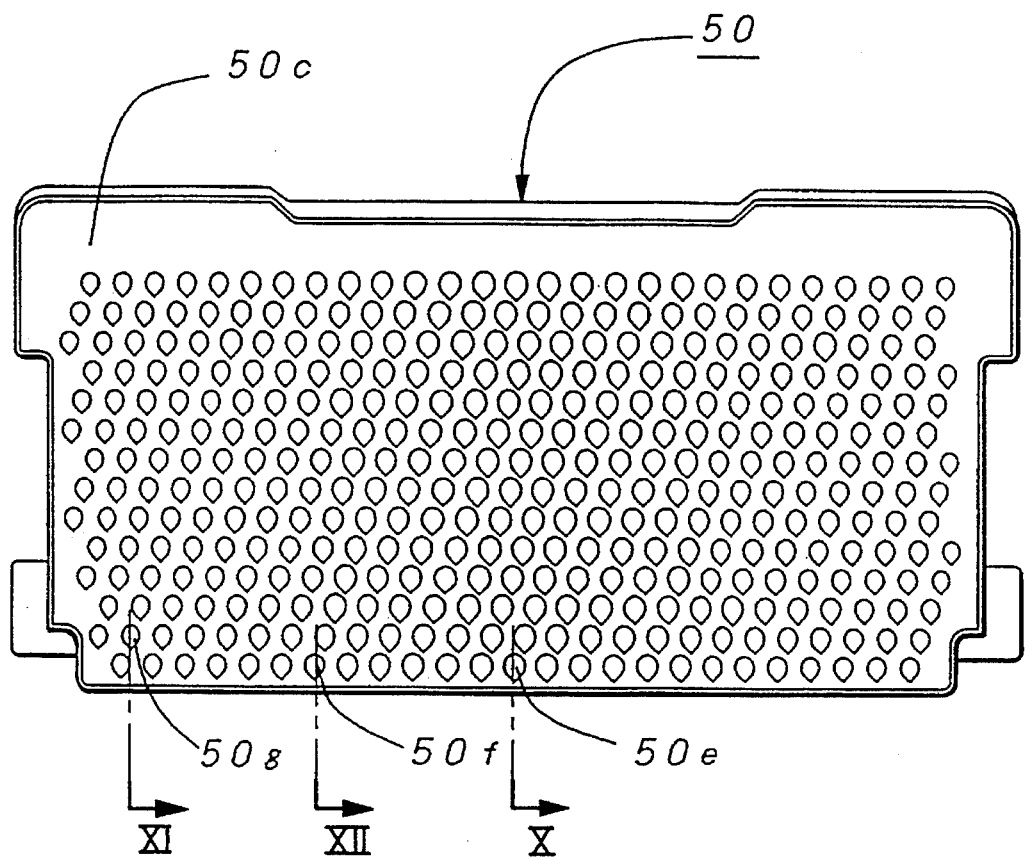
FIG. 9 is a front view of clamp teeth formed on a clamp member structured according to a third embodiment of the present invention, showing an arrangement thereof.

The arrangement of clamp teeth 50e provided in a clamp 50 according to the third embodiment, which is shown in FIG. 9, is similar to the arrangement of the conventional clamp teeth but the shapes of the respective clamp teeth 50e are different from those of the conventional clamp teeth.

Figure 10:
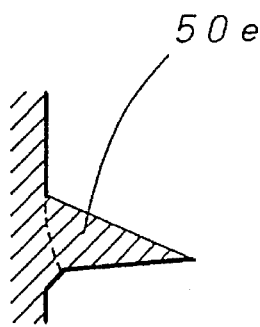
FIG. 10 is a longitudinal section view of one of clamp tooth formed on the central portion of the clamp member shown in FIG. 9 in the webbing width direction thereof.

That is, as shown in a section view of FIG. 10, the clamp teeth 50e provided in the central portion of the clamp 50 in the webbing width direction, similarly to the shape of the conventional clamp teeth, are formed in a substantially conical shape the end of which is inclined slightly toward the bobbin winding side of the webbing. This shape is easily bites into the surface of the webbing which is being drawn out. Also, the thickness of such clamp teeth is similar to that of the conventional clamp teeth.

Figure 11:
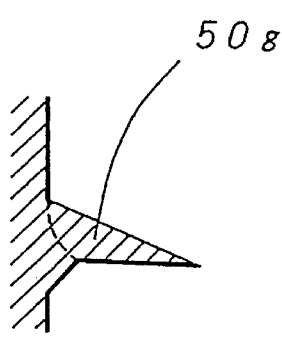
FIG. 11 is a longitudinal section view of one of clamp tooth formed on the and portions of the clamp member shown in FIG. 9 in the webbing width direction thereof.
Figure 12:
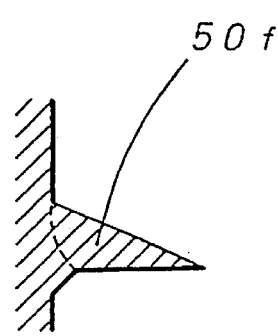
FIG. 12 is a longitudinal section view of one of clamp tooth formed in the portions of the clamp member shown in FIG. 9 between the central portion and the end portions thereof in the webbing width direction thereof.

On the other hand, the clamp teeth 50g provided on the two end portions of the clamp 50 in the webbing width direction, as shown in FIG. 11, are formed such that the amount of projection thereof from the webbing opposing surface is identical with that of the clamp teeth 50e, while the thickness thereof is finer than that of the clamp teeth 50e and thus the rigidity thereof is lowered for easy deformation. And clamp teeth 50f which are disposed between the clamp teeth 50e and 50g of the clamp 50, as shown in FIG. 12, are formed such that the amount of projection thereof from the webbing opposing surface is the same as the clamp teeth 50e and 50g but the thickness thereof is intermediate between the clamp teeth 50e and 50g.

Accordingly, in the clamp 50 according to the third embodiment, the thickness of the clamp teeth, that is, the mechanical strength of the clamp teeth is gradually lowered toward the end portion sides thereof from the central portion of the clamp 50 in the webbing width direction.

Due to this, when the clamp 50 according to the third embodiment holds the webbing 26 in cooperation with the lower plate 16, even if the lower plate 16 and base back surface 1b are bent, the clamp teeth 50e, 50f and 50g of the clamp 50 are deformed more easily in this order toward the end portions in the webbing width direction because the rigidity thereof is lowered in this order. This eliminates the possibility that the clamp teeth 50g pushing against the lower plate 16 to thereby lower the forces of the clamp teeth 50e and 50f situated adjacently will the central portion of the clamp 50 in the webbing width direction to bite into the webbing 26.

Therefore, in the clamp 50 according to the third embodiment, since not only the clamp teeth 50g provided on the end portion sides in the webbing width direction push against the lower plate 16 but all of the clamp teeth 50e, 50f and 50g of the clamp 50 are able to bite into the webbing 26, the clamp 50 can hold the webbing surface uniformly and is sure to prevent the webbing 26 from being drawn out.

The arranging distances and shapes of the clamp teeth of the clamp member according to the present invention are not limited to those illustrated in the respective embodiments but, of course, various changes are possible. For example, by reducing the number of the clamp teeth to be provided on the two end portions of the clamp member in the webbing width direction, it can be weakened for the webbing pressing forces of the opposing portions of the clamp member with respect to the two end portions of the webbing surface.

Further, the structure of the clamping mechanism and the shape of the clamp member are not limited to those illustrated in the above-mentioned embodiments but, of course, various changes are possible. For example, a clamping mechanism using a clamp member whose clamp is held at the swinging side end of a clamp holder journaled swingingly can be applied to a retractor.

As described above, according to the retractor with the clamping mechanism of the present invention, even if the strong tensile force is applied to the webbing and the clamp member is thereby pressed against the lower plate more strongly so that the lower plate together with the central portion of the base back plate is projectingly bent outwardly by the strong tensile force of the webbing, since the webbing pressing forces of clamp teeth provided on the clamp member with respect to the two end portions of the webbing in the width direction thereof are weakened, there is no possibility that the webbing two end portions in the width direction thereof can push against the lower plate on the base back plate.

This eliminates the possibility that the forces of the clamp teeth situated in the central portion of the clamp member in the webbing width direction to bite into the webbing can be lowered, and thus makes it sure that the clamp teeth can bite into the webbing even when high loads are applied. Therefore, the clamp member can hold the webbing surface uniformly and is sure to prevent the webbing from being drawn out.

That is, the present invention can provide a highly reliable retractor with a clamping mechanism which allows the clamp member to hold the webbing surface uniformly even when high loads are applied and thus can always provide a strong and stable clamping force.

What is claimed is:

1. A retractor with a clamping mechanism for holding a webbing directly in a vehicle emergency, comprising:

a retractor base;

a winding shaft supported rotatably on said retractor base for winding a webbing therearound;

a lower plate fixed to said retractor base; and a movable clamp member for holding the webbing between itself and said lower plate, said clamp member including on a webbing opposing surface thereof a plurality of clamp teeth respectively formed in a substantially conical shape for biting into a surface of the webbing to hold the webbing, and said clamp teeth being arranged to decrease in number toward said winding shaft.

2. The retractor of claim 1, wherein said clamp teeth are provided almost up to both ends of said clamp member in three clamp teeth lines on the webbing exit side, said clamp teeth being arranged to decrease in number toward said winding shaft.

3. The retractor of claim 1, wherein said clamp teeth are provided almost up to both ends of said clamp member in a first half of clamp teeth lines on the webbing exit side, said clamp teeth being arranged in a second half of the clamp teeth lines to decrease in number toward said winding shaft.

4. A retractor with a clamping mechanism for holding a webbing directly in a vehicle emergency, comprising:

a retractor base;

a winding shaft supported rotatably on said retractor base for winding a webbing therearound;

a lower plate fixed to said retractor base;

a movable wedge-shaped clamp member for holding a webbing between itself and said lower plate; and an upper plate for guiding said clamp member to a webbing holding position, wherein said clamp member includes on a webbing opposing surface thereof a plurality of clamp teeth for holding the webbing, and said clamp teeth being respectively formed in a substantially conical shape and being arranged to decrease in number toward said winding shaft from a webbing exit side.

5. The retractor of claim 4, wherein said clamp teeth are provided almost up to both ends of said clamp member in three clamp teeth lines on said webbing exit side and, said clamp teeth being arranged to decrease in number toward said winding shaft side.

6. The retractor of claim 4, wherein said clamp teeth are provided almost up to both ends of said clamp member in a half first of clamp teeth lines on said webbing exit side, said clamp teeth being arranged in a second half of the clamp teeth lines to decreasing number toward said winding shaft.

7. A retractor with a clamping mechanism for holding a webbing directly in a vehicle emergency, comprising:

a retractor base;

a winding shaft supported rotatably on said retractor base for winding a webbing therearound;

a lower plate fixed to said retractor base; and a movable clamp member for holding a webbing between itself and said lower plate, said clamp member including a plurality of substantially conical clamp teeth for biting into a surface of the webbing to hold the webbing, each of said clamp teeth having a projecting dimension which is substantially the same as each other from a webbing opposing surface of said clamp member, a thickness of said clamp teeth being lesser as the position of said clamp teeth becomes closer to an end portion of said clamp member in a webbing width direction.

* * * * *